United States Patent [19]

Winkler et al.

[11] 4,040,729
[45] Aug. 9, 1977

[54] ARTICULATED NOSE SUPPORT FOR SPECTACLE FRAME

[75] Inventors: Emil Winkler, Ispringen; Manfred Kappler, Pforzheim, both of Germany

[73] Assignee: Fa. Frey & Winkler GmbH & Co. KG, Pforzheim, Germany

[21] Appl. No.: 572,151

[22] Filed: Apr. 28, 1975

[30] Foreign Application Priority Data

Apr. 29, 1974 Germany .................... 7415001[U]

[51] Int. Cl.² ............................................. G02C 5/12
[52] U.S. Cl. .................................... 351/137; 351/138
[58] Field of Search ..................... 351/137, 88, 138

[56] References Cited

U.S. PATENT DOCUMENTS

| 2,080,847 | 5/1937 | Bouchard | 351/137 |
|---|---|---|---|
| 2,082,070 | 6/1937 | Lowres | 351/137 |
| 2,157,247 | 5/1939 | Schumacher | 351/137 X |
| 2,250,336 | 7/1941 | Vitolo | 351/137 |
| 2,257,966 | 10/1941 | Krapp | 351/138 |
| 3,431,045 | 3/1969 | Dietrich | 351/137 |

FOREIGN PATENT DOCUMENTS

| 1,217,651 | 5/1966 | Germany | 351/137 |
|---|---|---|---|
| 1,212,314 | 3/1966 | Germany | 351/137 |
| 31,396 | 1974 | Japan | |

Primary Examiner—Paul A. Sacher
Attorney, Agent, or Firm—Joseph A. Geiger

[57] ABSTRACT

An articulated nose support for spectacle frames in which a bracket insert, embedded partially in a nose pad, serves as a first pivot member and a stem frame, attached to a supporting stem, serves as a second pivot member surrounding the former, the male and female pivot elements in the form of cooperating journal trunnions and journal bores being part of either the one or the other pivot member. For assembly purposes, at least one pivot member is flexible and the journal trunnions have entry tapers.

15 Claims, 28 Drawing Figures

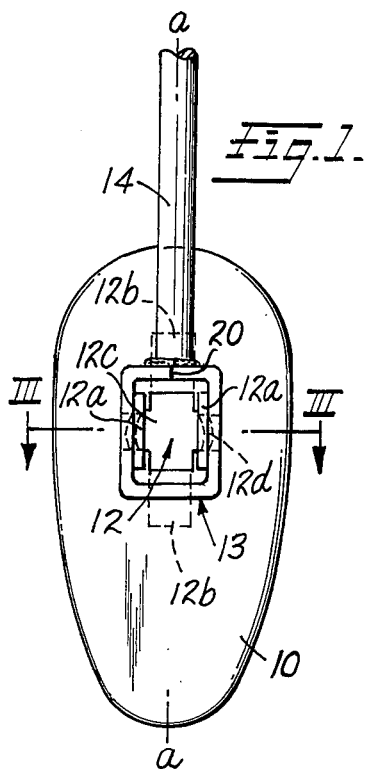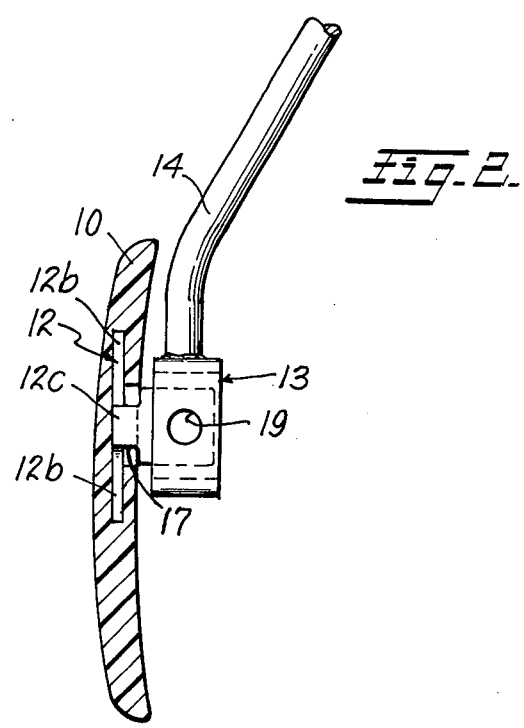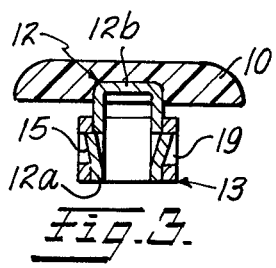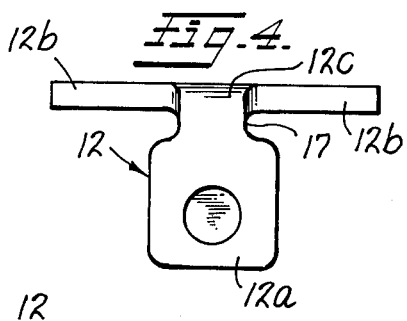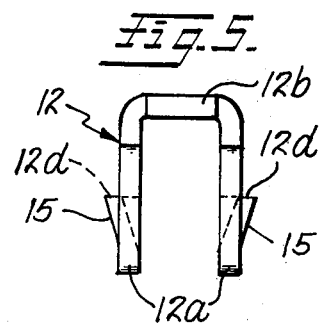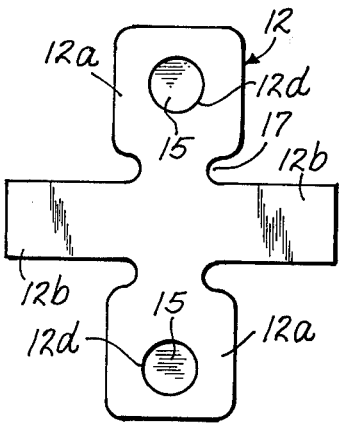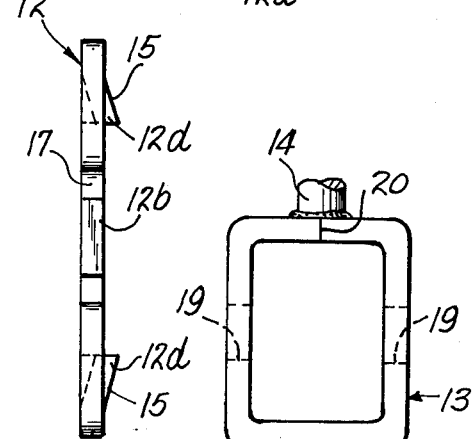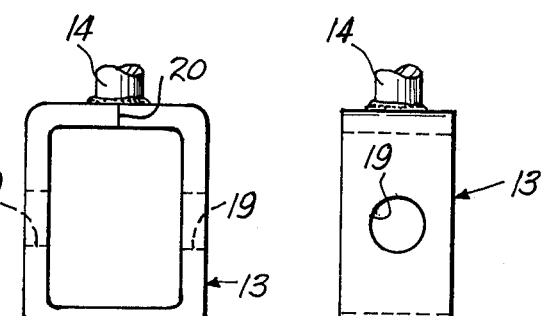

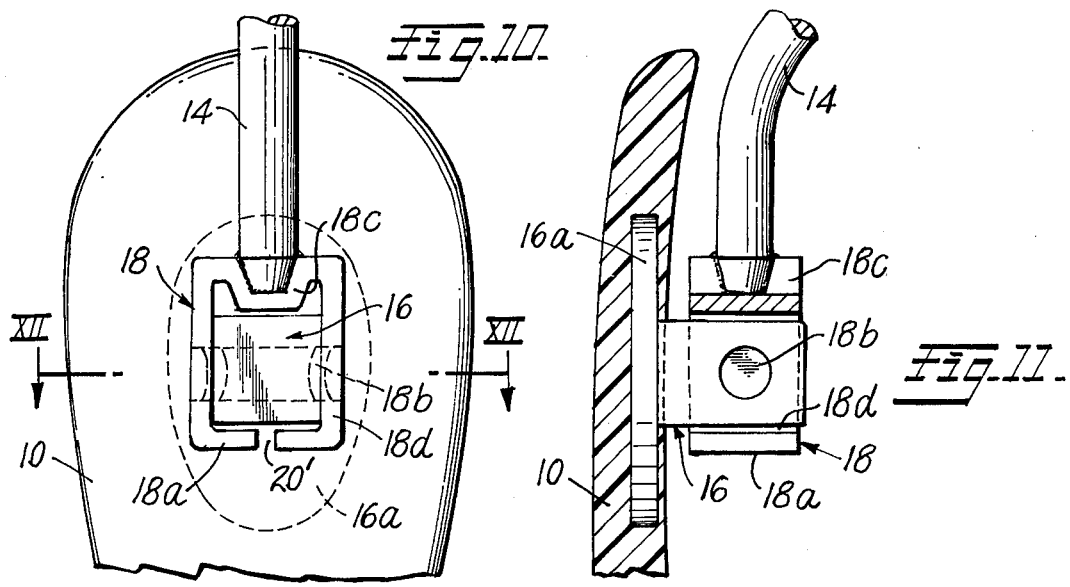
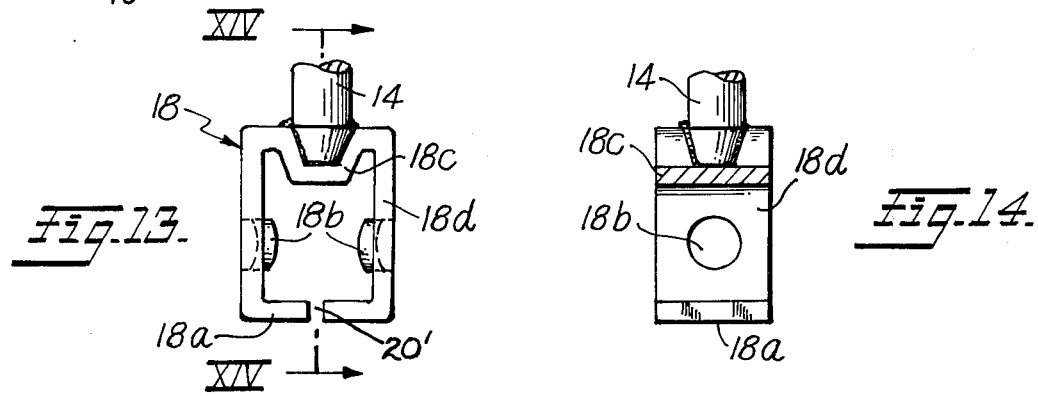
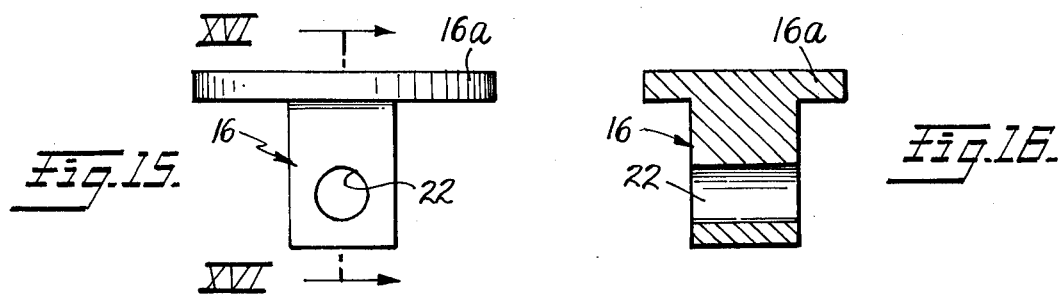

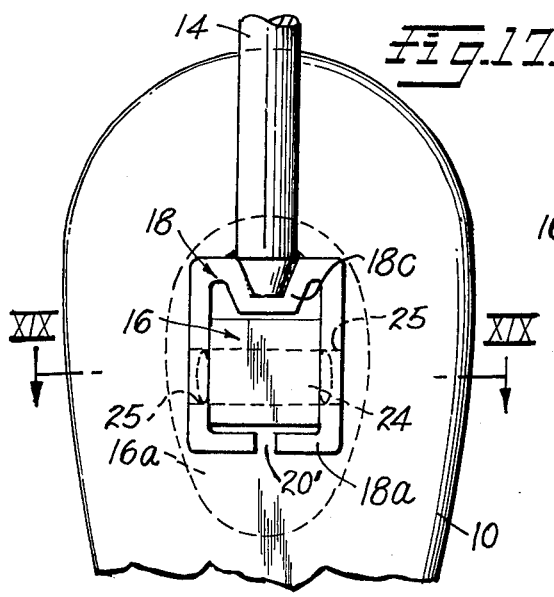
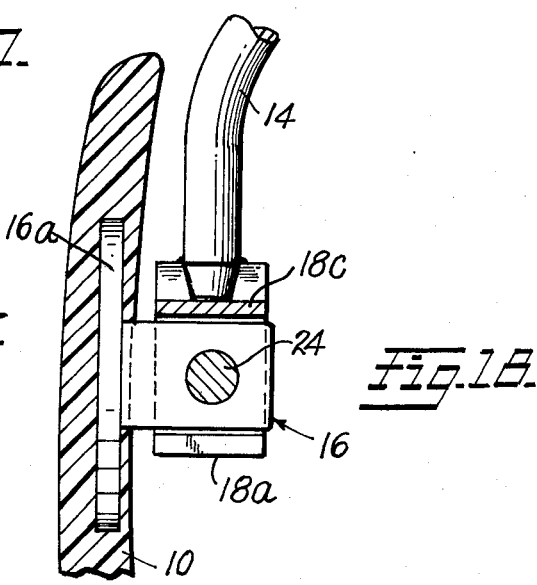
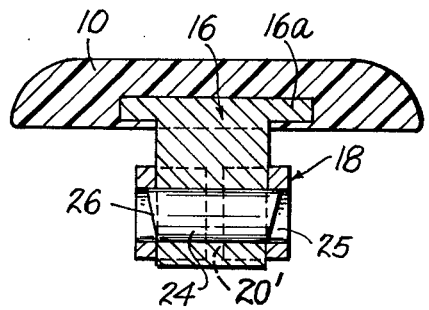
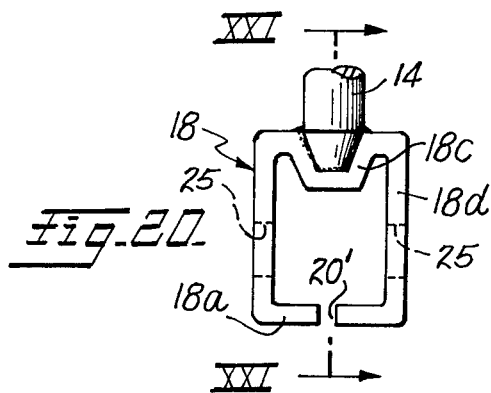
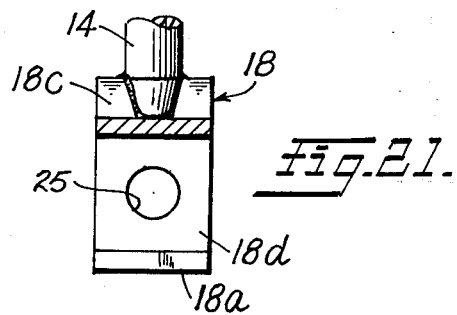
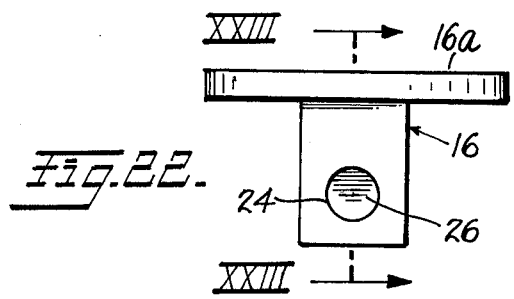
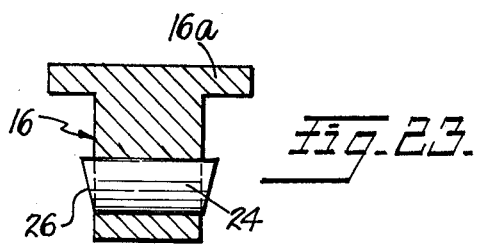

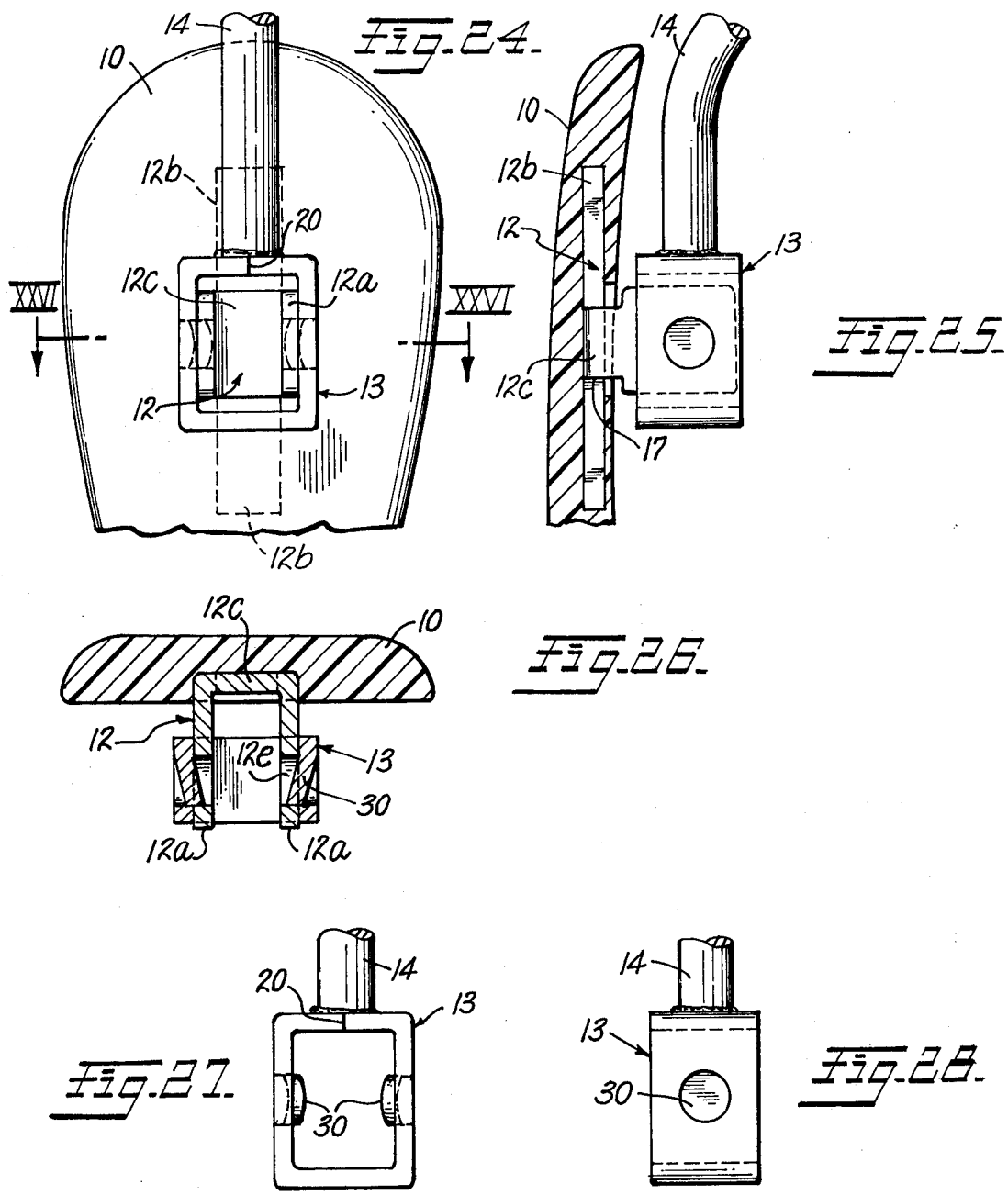

ARTICULATED NOSE SUPPORT FOR SPECTACLE FRAME

BACKGROUND OF THE INVENTION

1. Field of the Invention

The present invention relates to spectacle frames, and more particularly to articulated nose supports for spectacle frames, where a pair of nose pads is pivotably connect to two stem arms, the constituent parts of each pivot connection being a bracket insert protruding from the nose pad and a stem frame surrounding the bracket insert.

2. Description of the Prior Art

In conventional articulated nose supports for spectacle frames the bracket insert, protruding from the nose pad, takes the shape of an ear with a transverse pivot bore, while the cooperating stem frame has an aligned throughbore on one side portion and a threaded bore on the opposite side portion. A small screw, which may have an enlarged smooth shaft and a shoulder limiting its penetration into the threaded bore of the stem frame, serves as a pivot pin in cooperation with the pivot bore of the bracket insert.

The manufacturing costs of this type of articulated nose support are comparatively high, because the throughbore and the threaded bore of the stem frame required separate machining operations on the stem frame. Futhermore, particular care is necessary during assembly, because of the minature size of the pivot screw. Lastly, this design has the shortcoming of allowing only for a few threads in the threaded bore of the stem frame, so that assembly and disassembly of the pivot connection entails the risk that the threads are stripped from the stem frame, producing a situation which is difficult to repair.

Another prior art nose support of this type features a modified stem frame in which the pivot screw is replaced with oppositely aligned inwardly facing protrusions on the stem frame which engage the pivot bore of the bracket insert, thereby serving as trunnions. The bracket insert in this case is comparatively massive in thickness, having a thinner base plate embedded in the injection-molded nose pad. This pivot connection, though comparatively simple in terms of manufacturing costs, has the disadvantage that a special tool is required for the assembly of the constituent parts of the pivot connection. Such a structure is proposed in the Japanese Utility Model Publication No. 31 356/1974, FIGS. 1 and 2. In FIG. 3 of this publication is shown the first-mentioned prior art pivot connection using a pivot screw.

SUMMARY OF THE INVENTION

Underlying the present invention is the primary objective of devising an improved pivot connection for an articulated nose support of a spectacle frame which features simple components that are easy to manufacture and whose assembly is greatly simplified. At the same time, the pivot connection is to be capable of withstanding considerable mechanical stress in actual use.

The present invention proposes to meet the above objectives by suggesting an articulated nose support in which at least one of the two constituent parts of the pivot connection is capable of elastic deformation and carries either the male or the female constituent elements of the pivot connection, the elasticity of the part, or parts, being such that either one or both pivot elements are yielding in the direction of the pivot axis, so that the male pivot elements, e.g. short pivot trunnions, can be inserted into the journal bores of the other constituent part.

In one preferred embodiment, the flexible constituent pivot member is a U-shaped bracket insert which may either carry the female pivot elements, i.e. the journal bores, or the male pivot element in the form of journal trunnions.

In another preferred embodiment, the stem frame is transversely split opposite its attachment point to the stem arm, while the bracket insert is a comparatively massive part protruding from the nose pad. Again, the male elements of the pivot connection may be journal trunnions extending inwardly from the stem frame into a matching journal bore of the bracket insert, or the latter may carry a pivot pin which engages journal bores in the lateral legs of the stem frame.

BRIEF DESCRIPTION OF THE DRAWINGS

FIG. 1 shows a first embodiment of the invention in the form of an assembled articulated nose support seen from the rear;

FIG. 2 is an end view of the assembly of FIG. 1, showing the nose pad in longitudinal cross section;

FIG. 3 is a transverse cross section along line III—III of FIG. 1;

FIG. 4 shows separately and at an enlarged scale the bracket insert of the assembly of FIG. 1;

FIG. 5 is a side view of the bracket insert of FIG. 4;

FIG. 6 shows the bracket insert of FIGS. 4 and 5, as blanked from flat stock, prior to bending;

FIG. 7 shows the part of FIG. 6 is a side view;

FIG. 8 shows the stem frame of FIG. 1 at an enlarged scale;

FIG. 9 shows the stem frame of FIG. 8 in a side view;

FIG. 10 shows a second embodiment of the invention in the form of an assembled articulated nose support which is comparable, outwardly, to the assembly of FIG. 1;

FIG. 11 shows the assembly of FIG. 10 in a longitudinal cross section;

FIG. 12 shows the assembly of FIGS. 10 and 11 in a transverse cross section taken along line XII—XII of FIG. 10;

FIG. 13 shows the stem frame of FIGS. 10-12;

FIG. 14 shows the stem frame of FIG. 13 in a cross section taken along line XIV-XIV thereof;

FIG. 15 shows the bracket insert of FIGS. 10-12;

FIG. 16 is a cross section taken along line XVI—XVI of FIG. 15;

FIG. 17 shows a third embodiment of the invention in the form of an assembled articulated nose support comparable to the assembly of FIGS. 10-12;

FIG. 18 is a longitudinal cross section through the assembly of FIG. 17;

FIG. 19 is a transverse cross section through the assembly of FIGS. 17 and 18, taken along line XIX-—XIX of FIG. 17;

FIG. 20 shows the stem frame of FIGS. 17-19;

FIG. 21 is a vertical cross section taken along line XXI-XXI of FIG. 20;

FIG. 22 shows the bracket insert of FIGS. 17-19;

FIG. 23 is a cross section taken along XXIII—XXIII of FIG. 22.

FIG. 24 shows a fourth embodiment of the invention in the form of an assembled articulated nose support comparable to the assembly of FIG. 1;

FIG. 25 shows the assembly of FIG. 24 in a longitudinal cross section;

FIG. 26 shows the assembly of FIGS. 24 and 25 in a transverse cross section taken along line XXVI—XXVI thereof;

FIG. 27 shows the stem 1rame of FIGS. 24–26; and

FIG. 28 is a side view of FIG. 27.

DESCRIPTION OF THE PREFERRED EMBODIMENTS

The four embodiments of the invention, illustrated in FIGS. 1–9, 10–16, 17–23, and 24–28, respectively, of the drawings, are characterized by different specific pivot connections constituted by cooperating male and female pivot elements, as part of a stem frame 13 or 18, respectively, attached to a stem arm 14, and a cooperating bracket insert 12 or 16, respectively. In each case the pivot connection defines a pivot axis extending substantially perpendicularly to the longitudinal axis of an oblong, slightly convex nose pad 10, at a distance from its back side.

The cooperating male and female pivot elements are present in spaced pairs in each of the four embodiments of the invention, the female pivot elements being in each case a journal bore, or bores, respectively, and the cooperating male pivot elements being laterally protruding journal trunnions or an elongated pivot pin, respectively. The laytter is seated in a throughbore of the bracket insert.

Referring to the first embodiment of the invention, illustrated in FIGS. 1–9 of the drawing, the articulated nose support shown therein consists of a nose pad 10 of injection-molded plastic which is convexly curved to engage a wearer's nose flank, in order to support a spectacle frame thereon. To this nose pad 10 is attached a bracket insert 12, partially embedded within the body of the former, the bracket insert 12 protruding from the nose pad 10 with two spaced legs 12a. The latter are part of an initially flap stamping which is then bent into a U-shaped profile. Each of the two legs 12a further carries an outwardly protruding journal trunnion 12d defining the male portion of a pivot connection. Each journal trunnion is so shaped that it presents an entry taper 15 on its axially outwardly facing end, the inclination of the entry tapers being such that, together, they form a wedge-type double taper which increases in the direction toward the backside of the nose pad 10. The embedded portion of the bracket insert 12 is constituted by a bracket base 12c from which extend two anchoring lugs 12b which are aligned with the longitudinal axis a—a of the nose pad 10.

Surrounding the protruding legs 12a of the bracket insert 12 is a generally rectangular stem frame 13, to the upper side of which is attached a stem arm 14 which in turn is attached to the spectacle frame (not shown). The stem frame 13 is preferably obtained by bending flat band stock into a rectangular shape, the two ends of the stock forming a joint 20, at the point where the stem frame 13 is soldered to the stem arm 14. The stem frame thus forms a rigid unit with the stem arm 14. In the lateral sides of the stem frame are arranged journal bores 19 which serve as the female pivot elements, by receiving the journal trunnions 12d of the bracket insert 12.

FIGS. 4–7 illustrate in detail the structural features of the bracket insert 12. As can best be seen in FIGS. 6 and 7, which show the semi-finished bracket insert, after it is blanked from sheet metal stock, but before it is formed into the U-shape of FIGS. 4 and 5, the two legs 12a of the insert have a transition to the attached bracket base 12c in the form of restricted necks 17, so that the legs 12a are readily bendable in these areas of restriction. This shape not only simplifies the forming of the U-shape (FIG. 5), it also allows the legs 12a to resiliently flex towards each other. Thus, while the base 12c and the longitudinally extending anchoring lugs 12b are firmly embedded in the nose pad 10, the protruding legs 12a are resiliently bendable, for the purpose of snapping the stem frame 13 over the protruding tapered journal trunnions 12d of the legs 12a. The journal trunnions 12d, with their entry tapers 15, are preferably obtained in a simple die cutting operation, performed simultaneously with, or after the blanking operation: An obliquely faced die punch is penetrated partially into the stock of the bracket insert 12 (FIG. 7), so as to produce a corresponding obliquely faced circular protrusion on the opposite side of the wall.

The cooperating stem frame 13 is shown in detail in FIGS. 8 and 9. Its transverse journal bores 19 are designed to receive the journal trunnions 12d of the bracket insert 12, as the stem frame 13 is snapped over the flexible legs 12a of the bracket insert 12.

In FIGS. 10–16 is illustrated a second embodiment of the invention, showing a similar nose pad 10 assembled to a stem arm 14 of a spectacle frame, but using a differently structured pivot connection. While the outer one of the two parts is again a generally rectangular stem frame 18, soldered to the stem arm 14, the inner one of the two parts, i.e. the bracket insert 16, is no longer a sheet metal stamping, but has a more massive body which extends between the lateral frame portions of the stem frame 18. While this bracket insert 16 is obviously no longer elastically deformable, as was the insert 12 of FIGS. 1–9, the necessary elasticity for a snap-action assembly is now provided in the stem frame 18 whose lower frame portion 18a, i.e. the frame portion located opposite its attachment point with the stem arm 14, is split to form a gap 20'. This gap is conveniently formed by the two ends of the band stock from which the stem frame 18 is manufactured.

FIGS. 13–16 again illustrate in greater detail the two constituent members of the pivot connection, the stem frame 18 being shown in FIGS. 13 and 14, while the cooperating bracket insert 16 is shown in FIGS. 15 and 16. As these figures indicate, the cooperating male and female pivot elements are again two pivot trunnions on one of the parts, received in matching journal bore portions in the other part. However, in this case the associations are the reverse from those of the earlier embodiment, the male elements being journal trunnions 18b extending inwardly from the stem frame 18, while the journal bore portions are part of a single continuous journal bore 22 extending axially through the body of the bracket insert 16. As can be seen in FIG. 12, the journal trunnions 18b are again shaped to present opposing entry tapers 15, by means of which the stem frame 18 can be snapped over the protruding part of the bracket insert 16. And, as the figures indicate, the flexibility is in this case provided by the split stem frame 18, rather than by the bracket insert 16. The latter has again an enlarged base portion 16a with which it is firmly embedded in the material of the injection-molded nose pad 10.

A third embodiment of the invention is illustrated in FIGS. 17-23, where a stem frame 18, very similar to that of the previously described embodiment, forms a pivot connection with a bracket insert 16 which is identical to that previously described. However, the associations of the pivot elements themselves are again reversed, inasmuch as the female pivot elements are associated with the flexible stem frame 18, and the male pivot elements are formed by a journal pin 24 which is seated in the bore 22 of the bracket insert 16.

The constituent parts of the pivot connection are again shown separately in FIGS. 20-23, where it can be seen that the female pivot elements are aligned journal bores 25 in the lateral frame portions 18d of the stem frame 18. The male pivot elements, constituted by the two ends of the journal pin 24, are again provided with opposing entry tapers 26, as can be seen in FIG. 23.

It will be readily understood that, instead of the throughbore 22 and the journal pin 24 seated therein, the bracket insert 16 could also be designed to define suitable tapered journal trunnions as integral portions of its body, obtained either as a result of a molding or forging process, or in some other suitable manufacturing operation. The stem frame 18 of FIGS. 20 and 21, as well as the similar stem frame 18 of FIGS. 13-14 of the preceding embodiment, rather than having the shape of a plain rectangle, include a trapezoidally shaped upper frame portion 18c, thus forming a tapered groove in the center of the frame where it is attached to the stem arm 14. This groove structure not only improves the stability of the solder connection between the stem arm 14 and the stem frame 18, it also means that the lateral frame portions 18d of the stem frame 18 are longer, for a greater lateral flexibility of the stem frame. As in the other embodiments, the assembly operation is again a simple snap action in which the stem frame 18 is engaged over the bracket insert 16, as the entry tapers 26 of the journal pin 24 force the lateral frame portions of the stem frame 18 apart, until the journal bores 25 of the frame engage the trunnion portions of the journal pin 24.

A fourth embodiment of the invention is illustrated in FIGS. 24-28. This embodiment has a pivot connection which is very similar to the pivot connection of the first embodiment (FIGS. 1-9), consisting of a closed stem frame 13 and a formed bracket insert 12. The difference between this embodiment and the first embodiment is that the positions of the pivot elements are reversed, the male pivot elements being provided as inwardly protruding pivot trunnions 30 of the stem frame 13, while the bracket insert 12 has the corresponding pivot bores 12e. FIGS. 27 and 28 show the stem frame 13 separately.

It is generally preferable to arrange the cooperating pivot elements and associated constituent members of the pivot connection in such a way that an axial preload is created between the flexible pivot member and the rigid pivot member, in order to safely prevent any accidental disengagement of the pivot connection. The elastic characteristics of the yielding member of the pivot connection are preferably such that it will not suffer permanent deformation during the assembly process, so that the pivot elements will return to their intended axial position following deformation in the course of the assembly movement in which the entry tapers of the male pivot elements act as opening wedges and deflect the spaced flexing portions of the flexible pivot member.

While four different embodiments of the invention have been illustrated in the drawing and described in detail hereinabove, it should be understood that these embodiments are not exclusive and all-embracing of the present invention, and that different pivot member combinations, leading to additional embodiments, can be readily imagined. Thus, one may make both constituent members of the pivot connection flexible, meaning that a flexible bracket insert like insert 12 of FIGS. 4-7 could be combined with a flexible stem frame like the frame of FIGS. 13 and 14 or of FIGS. 20 and 21. Again, the male and female pivot elements could be associated with either one or the other of the constituent pivot members, one of the latter carrying the protruding journal trunnions, while the other has the cooperating journal bores. Thus, there are in fact six different, but closely related embodiments readily derivable from the present invention.

Lastly, while the three embodiments illustrated and described above have entry tapers on their journal trunnions, it is, of course, also possible to provide equivalent entry taper facets on those portions of the pivot members themselves, past which the protruding journal trunnions will slide when they are moved into assembly position.

It should therefore be understood that the foregoing disclosure described only preferred embodiments of the invention and that it is intended to cover all changes and modifications of these examples of the invention which fall within the scope of the appended claims.

We claim the following:

1. An articulated nose support for a spectacle frame designed to be supported on the flanks of the wearer's nose by engaging them with a spaced pair of such nose supports, each nose support comprising in combination:
   a stem arm extending downwardly from the spectacle frame;
   a generally rectangular, substantially closed stem frame rigidly attached to the lower end of the stem arm and serving as a first pivot member;
   a substantially parallel-faced nose pad which is generally oblong in contour, vertically oriented, and has a suitably curved front face for supportive contact with a wearer's nose flank;
   a bracket insert attached to the nose pad in the midportion thereof and having a carrying portion extending rearwardly and generally horizontally therefrom, said carrying portion being of a contour to fit inside the stem frame, to cooperate therewith as a second pivot member; and
   a pivot connection between said two pivot members, thereby attaching the stem frame to the carrying portion of the bracket insert, so that the nose pad is made pivotable about a horizontal axis which is oriented substantially parallel to the general plane of the nose pad and which is spaced a distance from its rear face; and wherein
   the pivot connection includes two axially spaced male and female pivot elements in the form of journal bores and cooperating journal trunnions defined by said two pivot members, respectively;
   the journal trunnions are short, generally cylindrical axial extensions of one pivot member received inside matching journal bores of the other pivot member;

at least one of the two pivot members is elastically deformable in the axial direction, so as to permit axial movement of its pivot elements during assembly; and the journal trunnions of one pivot member and at least one outer edge of the other pivot member define together entry taper means serving as a wedge during assembly, whereby the carrying portion of the bracket insert can be snapped into the stem frame, as the deformable pivot member is forcibly deflected in the axial direction.

2. An articulated nose support as defined in claim 1, wherein the entry taper means defined between the journal trunnions of one pivot member and at least one outer edge, of the other pivot member is constituted by oppositely facing entry tapers on those edge portions of said other pivot member past which the journal trunnions have to slide, when they are moved into alignment with the journal bores of said other pivot member.

3. An articulated nose support as defined in claim 1, wherein the entry taper means defined between the journal trunnions of one pivot member and at least one outer edge, of the other pivot member is constituted by oppositely facing entry tapers on the axial end faces of the journal trunnions.

4. An articulated nose support as defined in claim 3, wherein:

the pivot member which carries the journal trunnions is a sheet metal stamping;

the journal trunnions are short, partially extruded piercing plugs, obtained through the less than complete penetration of a piercing punch into the sheet metal; and the entry tapers are the result of an oblique cutting face on said piercing punch.

5. An articulated nose support as defined in claim 1, wherein:

the elastically deformable pivot member includes two resiliently bendable leg portions as part of a generally U-shaped structure in which the two leg portions have a length portion extending substantially perpendicularly to the pivot axis and carrying one kind of said pivot elements; and the elastic characteristics of the bendable leg portions are such that they permit an axial displacement of their associated pivot elements which is at least equal to the maximum depth of axial engagement between the cooperating male and female pivot elements.

6. An articulated nose support as defined in claim 5, wherein the two pivot members are of such a shape that, when assembled, they exert against each other an axial preload in the region of their cooperating pivot elements, as a result of the aforesaid elastic deformability of at least one of the members.

7. An articulated nose support as defined in claim 1, wherein:

the bracket insert serves as the elastically deformable pivot member and includes, for this purpose, a bracket base fixedly attached to the nose pad and two generally parallel legs extending rearwardly from the back side of the nose pad to constitute said carrying portion, the legs being of small width and considerable height, so as to be bendable against each other in the horizontal direction of the pivot axis; and the pivot elements which are associated with the bracket inser are arranged near the free ends of said parallel legs.

8. An articulated nose support as defined in claim 7, wherein:

the bracket insert is a sheet metal stamping and further includes two anchoring lugs extending from opposite ends of the bracket base;

the bracket base and its anchoring lugs are permanently embedded in the material of the nose pad which is injectionmolded; and the legs of the bracket insert are connected to said base on opposite sides thereof, at right angles to the anchoring lugs, the legs further including a neck portion of reduced width adjacent to the bracket base, for greater axial flexibility of the legs.

9. An articulated nose support as defined in claim 7, wherein:

the legs of the bracket insert carry the male pivot elements in the form of short axially outwardly extending journal trunnions;

the stem frame has matching axially aligned journal bores in its lateral frame portions; and the journal trunnions have oppositely facing entry tapers constituting said entry taper means.

10. An articulated nose support as defined in claim 7, wherein:

the lateral frame portions of the stem frame carry the male pivot elements in the form of short axially inwardly extending journal trunnions;

the two legs of the bracket insert have matching axially aligned bores; and the journal trunnions have oppositely facing entry tapers constituting said entry taper means.

11. An articulated nose support as defined in claim 1, wherein the stem frame serves as the elastically deformable pivot member and has, for this purpose, a gap in its lower frame portion opposite its attachment to the stem arm, thereby rendering the lateral portions of the stem frame flexible in the axial direction.

12. An articulated nose support as defined in claim 11, wherein:

the carrying portion of the bracket insert includes the male pivot elements in the form of short axially outwardly extending journal trunnions;

the stem frame has matching axially aligned journal bores in its flexible lateral frame portions; and the journal trunnions have oppositely facing entry tapers constituting said entry taper means.

13. An articulated nose support as defined in claim 12, wherein the two outwardly extending journal trunnions are the extremities of a journal pin seated in an axial throughbore of the bracket insert.

14. An articulated nose support as defined in claim 11, wherein:

the stem frame carries the male pivot elements in the form of short axially inwardly extending journal trunnions;

the bracket insert has an axially aligned journal bore portions into which said journal trunnions engage from opposite ends; and the journal trunnions have oppositely facing entry tapers constituting said entry taper means.

15. An articulated nose support as defined in claim 1, wherein both the stem frame and the bracket insert are elastically deformable, each having two leg portions linked together in the shape of a U, so as to be yielding in the direction of the pivot axis.

* * * * *